May 20, 1969

J. MULLER  3,445,002
FILTER UNIT WITH AUTOMATIC CLEANING AND AUTOMATIC DISCHARGE OF COLLECTED IMPURITIES

Filed Sept. 14, 1967

INVENTOR
Jacques Muller
BY
ATTORNEY

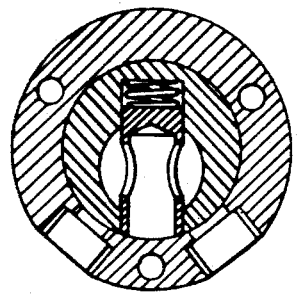
Fig. 2
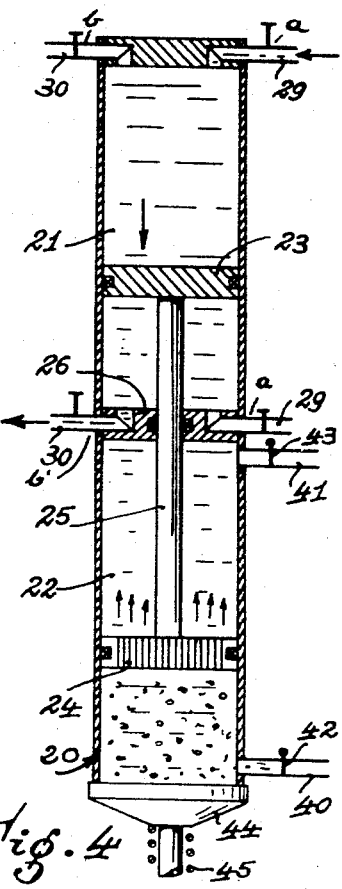
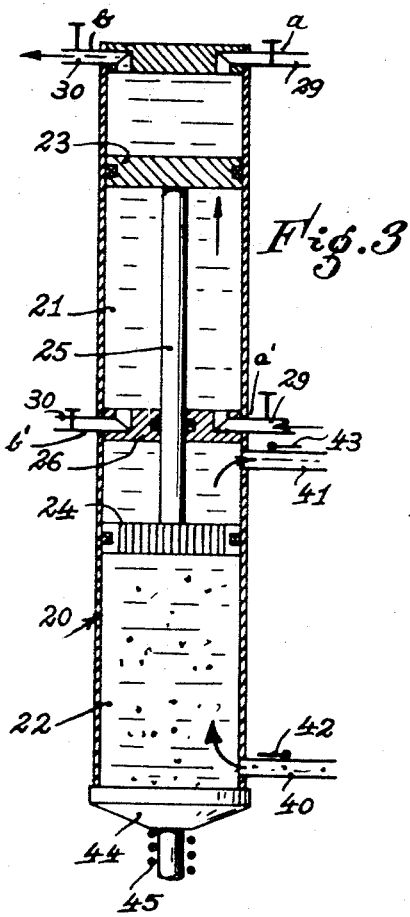
Fig. 3
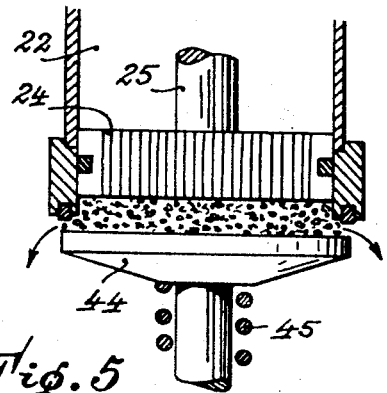
Fig. 4
Fig. 5

United States Patent Office 3,445,002
Patented May 20, 1969

3,445,002
FILTER UNIT WITH AUTOMATIC CLEANING AND AUTOMATIC DISCHARGE OF COLLECTED IMPURITIES
Jacques Muller, 123 Ave.-du-Genl.-de-Gaulle, La Garenne-Colombes, Hauts-de-Seine, France
Filed Sept. 14, 1967, Ser. No. 667,782
Claims priority, application France, Sept. 30, 1966, 78,347
Int. Cl. B01d 29/38, 27/12, 25/22
U.S. Cl. 210—108                                      8 Claims

ABSTRACT OF THE DISCLOSURE

A filter device having a plurality of circumferentially spaced columns of stacked grooved filter discs through which flows the fluid to be cleaned, with means being provided for reverse flushing of the filter columns one by one and automatic collection of the impurities or sludge collected by the filter columns and automatic discharge of such impurities or sludge.

As conducive to an understanding of the invention, it is noted that where filter are employed of the type shown in U.S. Patent No. 3,214,368 which utilizes a plurality of circumferentially spaced columns of superimposed grooved filter discs through which fluid is forced for cleaning, it is necessary from time to time to remove the impurities collected by the filtering action.

Where such cleaning is performed automatically by successively forcing purified fluid in reverse direction through the discs of the filter columns, one column at a time, if the equipment must be stopped periodically for removal of the collected impurities, the operation is relatively inefficient.

It is accordingly among the objects of the invention to provide a filter device which is relatively simple in construction and which will automatically perform the filtering operation, clean the filter columns one by one and discharge the impurities collected, all without any interference with the continuous filtering action of the unit.

According to the invention, these objects are accomplished by the arrangement and combination of elements hereinafter described and more particularly recited in the claims.

In the accompanying drawings in which are shown one of various possible embodiments of the several features of the invention.

FIG. 2 is a transverse sectional view of a typical valve that may be utilized.

FIGS. 3 and 4 are diagrammatic longitudinal sectional views of the automatic sludge recovery and discharge unit of the filter, and FIG. 5 is an enlarged detail sectional view of the discharge portion of the recovery and discharge unit of the filter.

Figure 1:
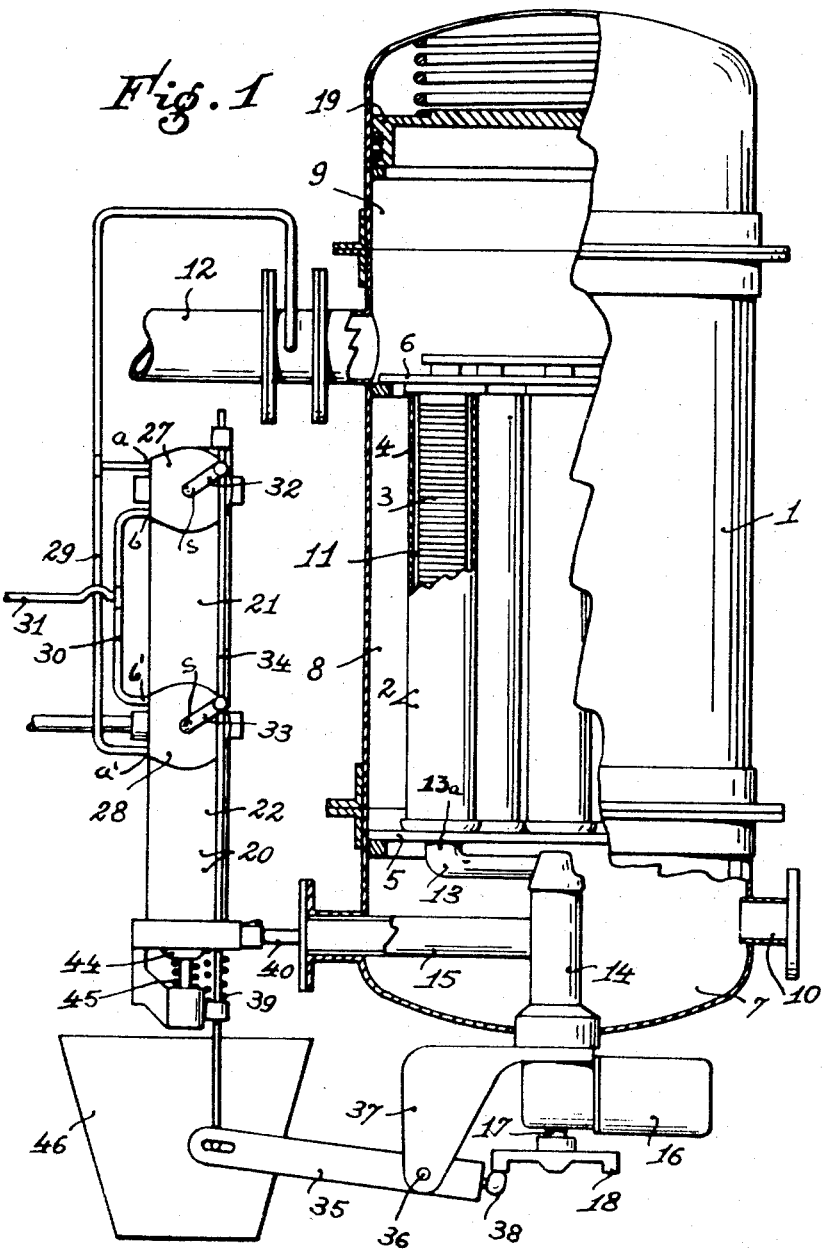
FIG. 1 is a longitudinal view partly in cross section of the filter unit.

Referring now to the drawings, as shown in FIG. 1, the filter comprises a casing 1 in which is disposed a plurality of filtering elements 2 each formed by a column or stack of grooved rings or discs 3, said discs being of the type shown in Patent No. 3,214,368. The columns or stacks of discs 3 are located in cylinders 4 and are regularly spaced along a circumference whose axis is identical with that of casing 1.

The filtering elements 2 are supported in upright position between a base plate 5 and an upper plate 6, both mounted in sealed manner in the casing 1 so as to form three separate compartments 7, 8 and 9. The lower ends of the bores of the filter columns are in communication with the compartment 7 through associated openings in the base plate 5. A spring urged piston 19 is positioned in compartment 9 to compensate for the loss of fluid therein in the manner hereinafter to be described.

The fluid to be purified is forced under pressure through inlet pipe 10 into the lower compartment 7. Such fluid flows upwardly through the bores of the filter columns and through the grooves of the rings or discs 3 into cylindrical cavities 11 between the filter columns 3 and the inner wall of each of the cylinders 4. The fluid is then discharged through appropriate openings in plate 6 into the upper compartment 9 and then flows through outlet pipe 12 to a suitable reservoir or its point of use.

Located in the lower compartment 7 is an L-shaped rotatable hollow arm 13, one end of which is rotatably mounted on the upper end of a hollow bearing 14 which is positioned at the end of discharge tube 15, the latter extending through the casing 1. The arm 13 has its other end 13a bent upwardly so that it is in sealing engagement with the undersurface of the base plate 5 and can come into alignment with each of he plurality of openings in said base plate which are aligned with the lower ends of the bores of the filter columns 3.

The arm 13 is driven by a motor 16 through an appropriate speed reducer, by means of a shaft 17 extending through the bearing 14. A cam plate 18 is rigidly connected to the lower end of shaft 17.

Associated with the casing 1 is a device for the recovery and evacuation of impurities and sediment, hereinafter called sludge, resulting from the filtering action. This device cooperates automatically with the filter to insure continuous operation of the unit.

Such device comprises a cylindrical casing 20 having two separate chambers 21 and 22 defined by an intervening partition 26. Slidably mounted in each of said chambers 21, 22, is a piston 23 and 24, the latter being porous, said pistons being connected together to move in unison by means of a shaft 25 extending through said partition 26. The piston 23 defines a dual action jack controlled by means of valves 27 and 28. Each of the valves 27 and 28 has a control shaft S connected by levers 32, 33 to an actuating rod or stem 34 to that said valves will be operated in unison. The valves are so arranged that when the port *a* of valve 27 is closed, the port *a'* of valve 28 will be open and when the port *b* of valve 27 is open, the port *b'* of valve 28 will be closed. In addition, when one of the ports of each valve is open, the other port will be closed.

As shown in the drawings, the ports *a*, *a'* are connected by pipe 29 which in turn is connected to the outlet pipe 12. The ports *b* and *b'* are connected by pipe 30 which in turn is connected to pipe 31.

The actuating rod 34 is normally urged downwardly by a coil spring 39 and the lower end of said rod 34 is connected to one end of a lever 35 pivoted between its ends as at 36 to a support 37. The other end of lever 35 carries a cam roller 38 which is retained against the cam surface of cam 18 by the force of the coil spring 39.

The lower portion of chamber 22 on the underside of piston 24, is connected to the discharge tube 15 by pipe 40, while the upper portion of the chamber 22 on the upper side of the piston 24, is connected by a pipe 41 to the pipe 10, which defines the inlet for the fluid to be purified.

The two pipes 40 and 41 are provided with valves 42 and 43 which close when the piston 24 moves downwardly.

By reason of the porosity of the piston 24, the fluid in the lower portion of chamber 72 can pass through said piston while retaining the impurities or sludge in such lower portion.

The lower portion of chamber 22 is normally closed by an axial valve 44 controlled by a coil spring 45.

When the motor unit 16 is energized, the equipment will function in the following manner:

The fluid to be purified is forced under pressure through inlet pipe 10 into the lower compartment 7. Such fluid flows upwardly through the bores of the filter columns and through the grooves of the rings or discs 3 into cylindrical cavities 11 between the filter columns 3 and the inner wall of each of the cylinders 4. The fluid is then discharged through appropriate openings in plate 6 into the upper compartment 9 and then flows through outlet pipe 12 to a suitable reservoir or its point of use.

With the rotating hollow arm 13 located under one of the filtering elements 2, due to the pressure in compartment 9, a portion of the fluid forced under pressure into compartment 9 from the other filtering elements, will be forced into the associated cavity 11. This fluid will then flow in reverse direction through the grooves of the stacked filter discs to dislodge the impurities lodged in such grooves into the bore of the filter column. Such impurities will be forced downwardly through arm 13 and hollow bearing 14 into tube 15 to be discharged through pipe 40, through open valve 42 into the lower portion of chamber 22 of cylinder 20 as shown in FIG. 3. At such time, due to the position of the cam plate 18, and through the action of lever 35 and rod 34, the valves 27, 28 will be so positioned that ports $a$ and $b'$ of valves 27, 28 respectively will be closed and ports $b$ and $a'$ of valves 27, 28 respectively will be open. As a result, fluid under pressure will flow from pipe 12 through line 29 into port $a'$ of valve 28 to force the piston 23 upwardly correspondingly to move the porous piston 24 (FIG. 3). As a result, the fluid in the upper portion of chamber 21 will be discharged through open port $b$ of valve 27 through lines 30 and 31 and the fluid in chamber 22 above piston 24 will be forced through open valve 43 and pipe 41 to tube 10.

Thus, the sediment or sludge from the filter column 3 with which the hollow arm 13 is aligned, will be discharged into the lower portion of chamber 22 and such discharge will be completed with full cleaning of such filter column when pistons 23, 24 are in their uppermost position.

At this time, due to the action of drive motor 16, the hollow arm 13 will be moved toward alignment with the next filter column and the cam plate 18 will also be rotated. As a result, due to the force of coil spring 39, the rod 34 will be moved downwardly to reverse the position of the valves 27, 28. Thus, ports $a$ and $b'$ of valves 27, 28 will now be opened and ports $b$ and $a'$ of said valves will be closed. Consequently, referring to FIG. 4, fluid under pressure will be forced through open port $a$ to move the pistons 23 and 24 downwardly. At such time the valves 42 and 43 will close. Due to the porosity of the piston 24, the fluid in the portion of chamber 22 beneath the piston 24 will flow through such piston while retaining the sludge in the portion of the chamber 22 beneath the piston. The fluid in the portion of chamber 21 beneath piston 23 will be discharged through open valve $b'$ through pipe 30.

At the end of the cycle when the rotating arm 13 is aligned with the next filtering column, the cam 18 will be in the position shown in FIG. 1, the valves 27, 28 will again be reversed, and the operation will repeat.

When the sludge collected in the lower portion of chamber 22 has accumulated to a sufficient extent, the downward movement of piston 24 will create sufficient pressure on such sludge to force the spring urged valve 44 to open, for automatic discharge of such sludge into a suitable receptacle 46.

It is to be noted that during the reverse flow action, although a portion of the fluid in compartment 9 will be discharged therefrom into the associated filter column, due to the spring urged piston 19, no cavitation will occur.

With the above construction, a completely automatic filter device is provided which not only will provide for automatic cleaning of the filter elements themselves, but also provides for automatic collection of the impurities or sludge resulting from the filtering action and automatic discharge of such sludge.

As many changes could be made in the above construction, and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what I claim as new and desire to secure by Letters Patent of the United States is:

1. A filter unit comprising a hollow casing having an upper compartment with an outlet port for discharge of filtered fluid therefrom, a lower compartment having an inlet port for fluid to be filtered and an intermediate compartment, a plurality of filter elements in said intermediate compartment, each comprising an elongated cylinder, said cylinders being circumferentially spaced in said casing, a column of superimposed grooved discs in each cylinder, the outer periphery of said column being spaced from the wall of said cylinder to define a cavity, each of said columns having a bore in communication at its lower end with said lower compartment, each of said cavities being in communication with said upper compartment, a rotary hollow arm in said lower compartment adapted to be aligned successively with the lower end of each of said filter column bores, an outlet in communication with said hollow arm, a recovery and discharge device comprising a cylinder having a piston slidable therein, means connecting the portion of said cylinder beneath said piston to the outlet in communication with said hollow arm, a normally closed valve controlling the end of said cylinder, drive means to rotate said rotary arm and means controlled by said drive means to effect movement of said piston toward said valve to compress the contents of said cylinder beneath said piston thereby to open said valve for discharge of said contents.

2. The combination set forth in claim 1 in which said cylinder has a partition therein defining two chambers, said piston being slidably mounted in one of said chambers, a drive piston slidably mounted in the other of said chambers, a shaft connecting said two pistons and the means controlled by said drive means to effect movement of said first piston comprises valve means arranged alternately to connect a source of fluid under pressure to exert force against opposed sides of said drive piston to reciprocate the latter and the second piston connected thereto.

3. The combination set forth in claim 2 in which said valve means are connected in tandem, a cam is driven by said drive means and operatively connected to said valve means to actuate the latter.

4. The combination set forth in claim 3 in which each of said valve means has two ports, one of said ports of each of said valve means defining a pressure inlet port and controlling the flow of fluid under pressure to the portion of said cylinder on each side of said drive piston respectively, and the other of said ports of each valve means defining a pressure outlet port and controlling discharge of fluid under pressure from the portion of said cylinder on each side of said drive piston respectively, one of said two ports of each valve means being open and the other being closed, a control rod is operatively connected to said valve means and controlled by said cam, whereby in one position of said cam, the inlet pressure port of one of the valve means will be open and the inlet pressure port of the other valve means will be closed and the pressure outlet port of said first valve means will be closed and the pressure outlet port of the other valve means will be open.

5. The combination set forth in claim 4 in which the pressure inlet port leading into the portion of the cylinder beneath the drive piston will be open when the rotary arm is aligned with the bore of an associated filter column.

6. The combination set forth in claim 4 in which means are provided connecting the pressure inlet ports of said valve means to the outlet port of said upper compartment.

7. The combination set forth in claim 2 in which said rotary arm is in communication with the chamber in which said first piston is mounted, a first valve is associated with the communication between said rotary arm and said chamber, the portion of said chamber above said piston has an outlet, a second valve controls said outlet, said valves being closed when said first piston is moved downwardly and open when said piston is moved upwardly.

8. The combination set forth in claim 7 in which said first piston is porous.

References Cited

UNITED STATES PATENTS 3,283,903 11/1966 Muller _____ 210—333 X
3,380,591 4/1968 Muller _____ 210—333 X SAMIH N. ZAHARNA, *Primary Examiner.*

FRANK A. SPEAR, Jr. *Assistant Examiner.*

U.S. Cl. X.R.

210—134, 136, 333, 488